US008651398B2

(12) United States Patent
Trennenpohl

(10) Patent No.: US 8,651,398 B2
(45) Date of Patent: Feb. 18, 2014

(54) CENTRAL BAR FOR SPRAYING AND/OR DISTRIBUTING PRODUCTS IN POWDER, LIQUID AND GRANULATE FORMULATIONS

(75) Inventor: Atila Stapelbroek Trennenpohl, Não Me Toque (BR)

(73) Assignee: Stara S/A Industria de Implementos Agricolas, Nao Me Toque (BR)

( * ) Notice: Subject to any disclaimer, the term of this patent is extended or adjusted under 35 U.S.C. 154(b) by 475 days.

(21) Appl. No.: 12/680,459

(22) PCT Filed: Aug. 29, 2008

(86) PCT No.: PCT/BR2008/000261
§ 371 (c)(1),
(2), (4) Date: Mar. 26, 2010

(87) PCT Pub. No.: WO2009/039596
PCT Pub. Date: Apr. 2, 2009

(65) Prior Publication Data
US 2011/0017849 A1    Jan. 27, 2011

(30) Foreign Application Priority Data
Sep. 28, 2007  (BR) .................................... 0703229

(51) Int. Cl.
*B05B 1/20*      (2006.01)
(52) U.S. Cl.
USPC .......................................... 239/167; 239/172
(58) Field of Classification Search
USPC .................. 239/159–169, 172, 175
See application file for complete search history.

(56) References Cited

U.S. PATENT DOCUMENTS

| 4,039,147 | A | * | 8/1977 | Hugg | 239/167 |
|---|---|---|---|---|---|
| 4,441,655 | A | * | 4/1984 | Blumhardt | 239/163 |
| 4,561,591 | A | * | 12/1985 | Ballu | 239/159 |
| 5,375,767 | A | * | 12/1994 | Thorstensson | 239/164 |
| 5,630,547 | A | * | 5/1997 | Klemenhagen et al. | 239/161 |
| 5,884,852 | A | * | 3/1999 | Balmer | 239/654 |
| 5,954,270 | A | * | 9/1999 | Rosset | 239/159 |
| 5,957,383 | A | * | 9/1999 | Benest | 239/166 |
| 6,047,901 | A | * | 4/2000 | Pederson et al. | 239/159 |
| 6,234,407 | B1 | * | 5/2001 | Knight et al. | 239/163 |
| 6,315,218 | B1 | * | 11/2001 | Guesdon | 239/159 |

(Continued)

FOREIGN PATENT DOCUMENTS

DE    20 2007 011 631 U1    11/2007
EP       1 525 784 A2         4/2005

*Primary Examiner* — Christopher Kim
(74) *Attorney, Agent, or Firm* — Muncy, Geissler, Olds & Lowe, PLLC

(57) ABSTRACT

The central bar for spraying and/or distributing products in powder, liquid and granulate formulations refers to a central bar (1) to be fixed on the chassis (2*a*), between the front (2*b*) and the back (2*c*) wheels of a propeller vehicle (2), which is composed of a central frame set (3) and two side bars (4), where the central frame set (3) is composed of two brackets (3*a*) fixed to the chassis (2*a*) of said propeller vehicle (2); a horizontal pantograph subset (3*b*); two vertical pantograph subsets (3*c*), linked between them by the top side arms (3*f*) through an alternator axis (3*i*); two top articulation subsets (3*e*) formed from the extensions of the top side arms (3*f*); a shock absorption system, through bearings (3*u*) fixed to the inner walls of the brackets (3*m*) which are fixed to the side bars (4), wherein the internal braces (3*n*) are the end of the course; two bottom side subsets (3*d*) which are formed from the extensions of the bottom side arms (3*h*) driven by the hydraulic actuators (3*t*).

2 Claims, 9 Drawing Sheets

(56) References Cited

U.S. PATENT DOCUMENTS

Figure 1:
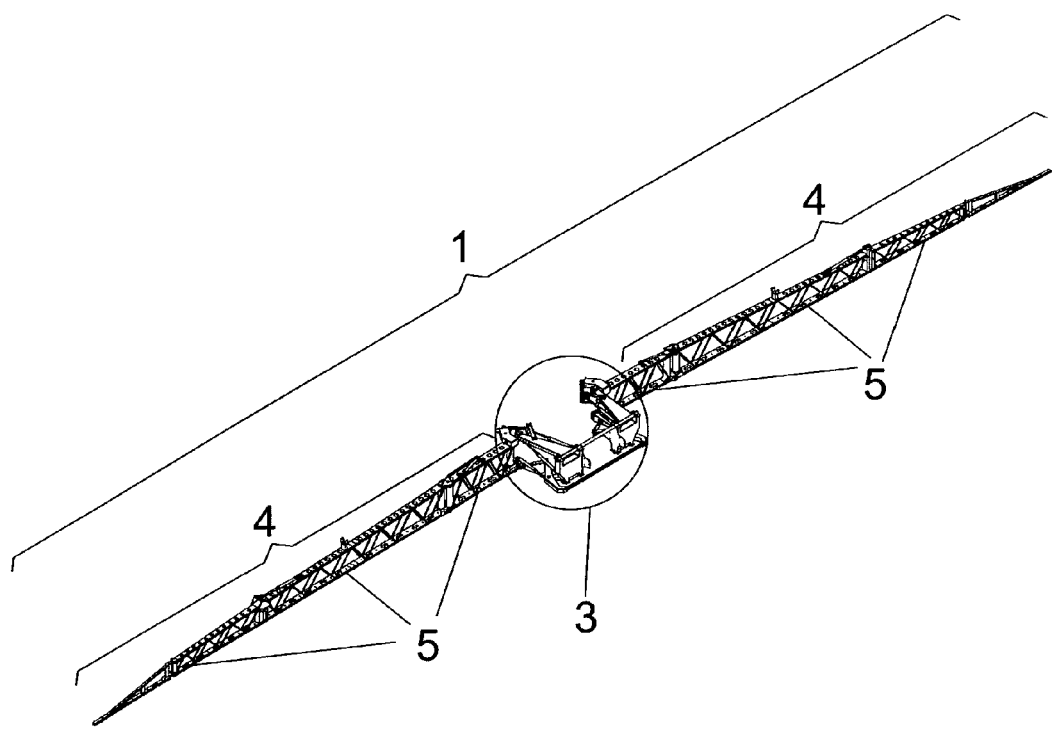

| | | | |
|---|---|---|---|
| 6,343,661 B1 * | 2/2002 | Thompson et al. | 172/444 |
| 6,644,562 B2 * | 11/2003 | Tango | 239/159 |
| 6,942,735 B2 * | 9/2005 | Rich | 118/313 |
| 7,063,273 B2 * | 6/2006 | Hahn et al. | 239/159 |
| 7,152,811 B2 * | 12/2006 | Gunlogson et al. | 239/159 |
| 7,429,003 B2 * | 9/2008 | Thompson et al. | 239/167 |
| 7,631,817 B2 * | 12/2009 | Thompson et al. | 239/159 |
| 7,740,189 B2 * | 6/2010 | Meyer et al. | 239/159 |
| 7,823,803 B2 * | 11/2010 | Peterson et al. | 239/166 |
| 7,913,930 B2 * | 3/2011 | Theeuwen et al. | 239/164 |
| 8,033,482 B2 * | 10/2011 | Honermann | 239/289 |
| 8,464,967 B2 * | 6/2013 | Kuphal et al. | 239/168 |
| 2006/0245904 A1 * | 11/2006 | Thompson et al. | 414/723 |

* cited by examiner

CENTRAL BAR FOR SPRAYING AND/OR DISTRIBUTING PRODUCTS IN POWDER, LIQUID AND GRANULATE FORMULATIONS

The invention disclosed in this specification pertains, in a general way, to the technological field of agricultural machinery and implements, and refers more specifically, to a central bar for spraying and/or distributing products in powder, liquid and granulate formulations, with a hitherto unknown placement of its components, since it is fixed between the front wheel and the back wheel of the propeller vehicle, which associated to the application—in an innovative way—of a series of technological resources in the central frame as regards the propeller vehicle, creates from part of the central frame a set of two brackets fixed on the propeller vehicle chassis, this part being a component of a horizontal pantograph set and two vertical pantograph sets, the vertical ones having an alternator axis which joins the upper side arms thereof in a rigid way. The central frame is also composed of actuating and pulling elements articulated by means of balls and cross pieces, supplementing in this way the opening and closing features of the side bars, the work height rigging of the whole central bar, independent opening and closing of the side bars and an angular movement in the vertical direction, synchronized or independent from the same.

The state of the art in this technological field consists of spraying bars for agricultural sprayers and fertilizer applicators, agricultural enhancers in powder, liquid or granulate forms. All the spraying and distribution bars comprised within the state of the art use the same mechanic or hydraulic principles and possess equivalent constructive formulas which produce similar results.

The problem with this type of equipment derives from the movements made by the propeller vehicle when moving over irregular ground, since such transit produces abrupt movements in all directions, with different intensities and different dimensions during movements. Such movements are transferred to all mechanical components of the device and, after some time of use the components and stabilizing means tend to have cracks and/or strain due to stress.

The impact and vibration absorbing means in said conventional equipment, unavoidable in this type of operation, are composed of mechanisms which have flaws in damping and stabilization during the work, which are made worse by the fact that the existing frame systems are not independent from the vehicle's movements as regards the bars, transferring to the application systems strong impacts which may cause the appearance of cracks in the relevant mechanisms. Some frame systems possess the above mentioned independence, but the courses of the impact absorbing mechanisms produced by the propeller vehicle's movement are minor, which implies more efficiency than that of former mechanisms, although it does not solve the problem completely, since it causes the bars to collide much more frequently at course ends, thus producing impact transfer and making the mechanism ineffective for preventing ruptures due to stress which are caused after some time of use. Currently used mechanisms are always placed in the rear or front portion of the propeller vehicle, that is, they are always placed beyond the axis of the bearings, either to the front or to the rear, and the greater the distance thereof from the intermediate point of the vehicle axes the larger the oscillations, and therefore, the larger the risks of the bars being damaged.

Obviously, as regards efficiency of the stabilization of the bars during working movements, the said conventional implements leave much room for improvement. The flaws in the technical resources implemented for absorbing jolts and shaking caused by the propeller vehicle to the application bars are evident.

The invention disclosed in this specification refers to spraying and distribution bars, with a new concept in placement, operativity and absorption of the vibrations and impacts inherent to the operation of this kind of equipment, featuring a series of advantages as regards the current state of the art.

The proposed bar system is placed between the front and back wheels of the propeller vehicle, which may be placed beyond the axis of the wheels both to the front and the rear, and even thus the central position provides three major advantages as regards known placements, by promoting a better visualization of the bars during the application operations, apart from protecting the operator, since the spraying of chemicals takes place in front of the cabin and to the rear thereof, completely eliminating the possibility of the operator being reached. Another advantage inherent to this invention is the increase in the useful life of the central frame mechanisms and the application bars, due to their central placement, since when the propeller vehicle suffers any sudden oscillations—both lateral and vertical or a change in direction or system, through damping and stabilization items which are rubber bearings, accumulators, springs and hydraulic accumulators, it causes the effect of said load to be smaller, providing (as well as more durability) a better application of the products due to the great stability of the bars as regards the ground. Another important effect which takes place when the bar is placed between the front and back wheels is the tandem effect, which reduces the vertical movement caused by the passage of one of the wheels over an uneven part of the ground, wherein one of the axes accompanies such uneven portion of the ground and the other one remains at ground level, since the movement of climbing or going down an obstacle is smaller at the intermediate point of the propeller vehicle, which significantly reduces the harmful effects caused by said oscillations and impacts.

Another technical advantage of this new placement is the better side control the operator has in order to keep the spraying or distribution bar set aligned in the product application band, thus avoiding superposition or failures in the application.

As well as the novel placement of the new central frame system for supporting the side bars, the invention comprises a novel set of balls and/or cross pieces in the components which make up the union between the side bars and/or the central frame, in order to enable movement of the side bars without losing horizontal and vertical alignment when the system movements take place simultaneously (in three dimensions), maintaining the uniform application of the products on the target.

The central frame is designed in order to enable independence of the side bar movements as regards movements of the propeller vehicle, which is achieved through the joint action of a horizontal pantograph set which joins the side bars at their bottom bases, enabling vertical, simultaneous and reverse rotation of the side bars up to a limit of 20°, creating a state of balance between the same.

The central bar may also have any of its side arms rotated, independently, through hydraulic actuators, in the vertical direction, with an angular movement of about 15° upwards and 5° downwards, rotated from components which are applied to the extensions of the top and bottom arms of the vertical pantographs, the horizontal pantograph also taking part in this, which creates a relative balance between the side bars which results in a counterweight system between them.

The adjustment of the working height of the side bars as regards the ground is made by the vertical pantograph system, through the application of hydraulic actuators.

In order to absorb shock, not only when braking but during ignition and changes of direction, the central bar has a set of articulated braces with balls and cross pieces, bearings and brackets, which keep a specific position of the side bars, but leave them in complete freedom for absorbing the horizontal oscillations caused by the propeller vehicle.

DESCRIPTION OF THE ATTACHED DRAWINGS

In order for this invention to be understood in full and put into practice by any technician in this technological field, it will be clearly, concisely and sufficiently explained so as to enable the reproduction thereof based on the attached drawings mentioned below, which illustrate and exemplify the same. The following figures were made from a spraying set and keep the same innovative principles which are applicable to the distribution bars of products with powder or granulate formulations:

FIG. 1: Perspective view of a complete central bar, in the case of a spraying equipment, depicting and mentioning the main components and sets involved in the invention.

Figure 2:
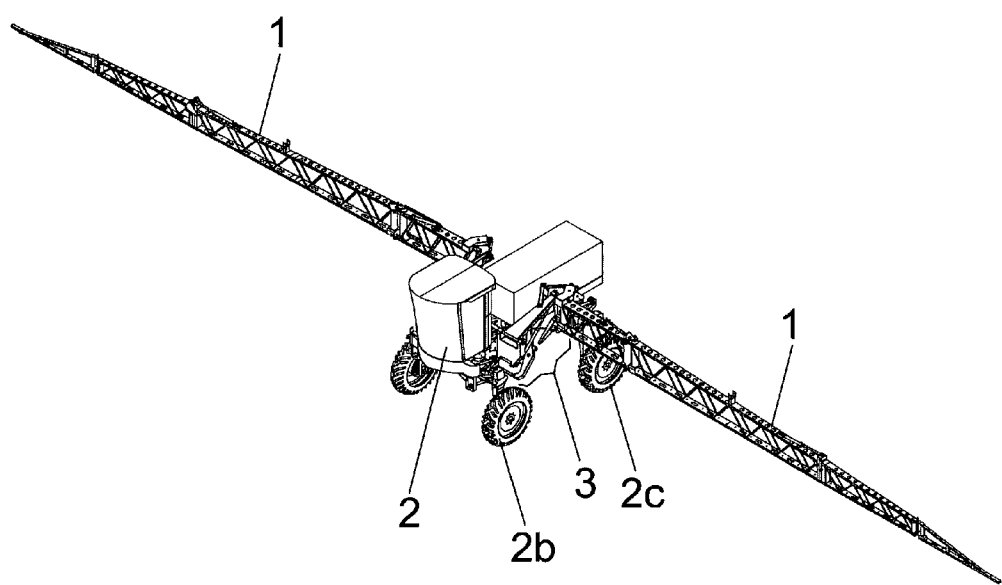

FIG. 2: Perspective view of a complete central bar mounted on a propeller vehicle with spraying equipment, depicting and mentioning the main components involved in this invention and also showing the intermediate placement of the central bar fixed on the propeller vehicle chassis.

Figure 3:
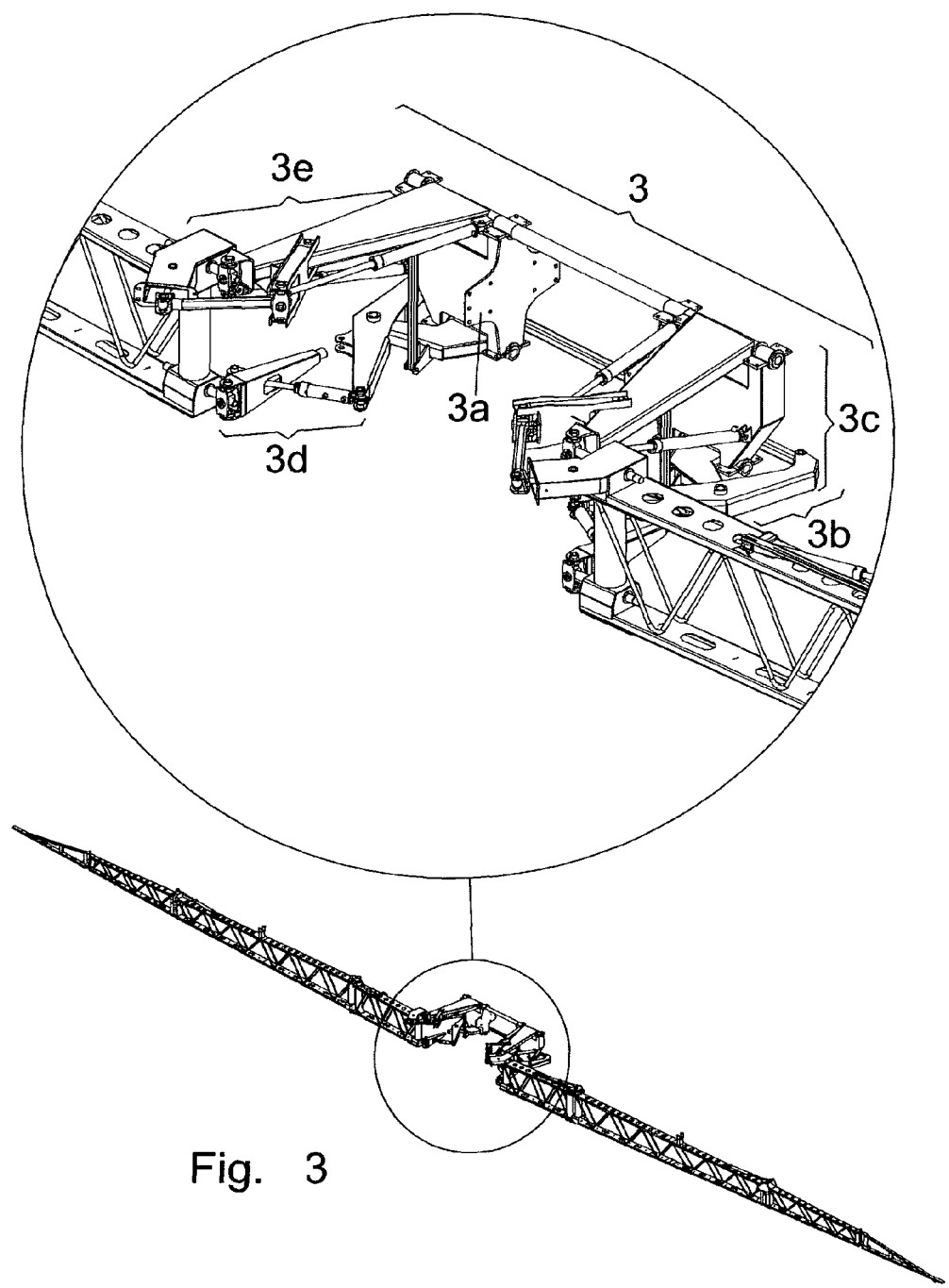

FIG. 3: Perspective view of the central portion of the central bar, allowing for visualization and indication of the respective subsets.

Figure 4:
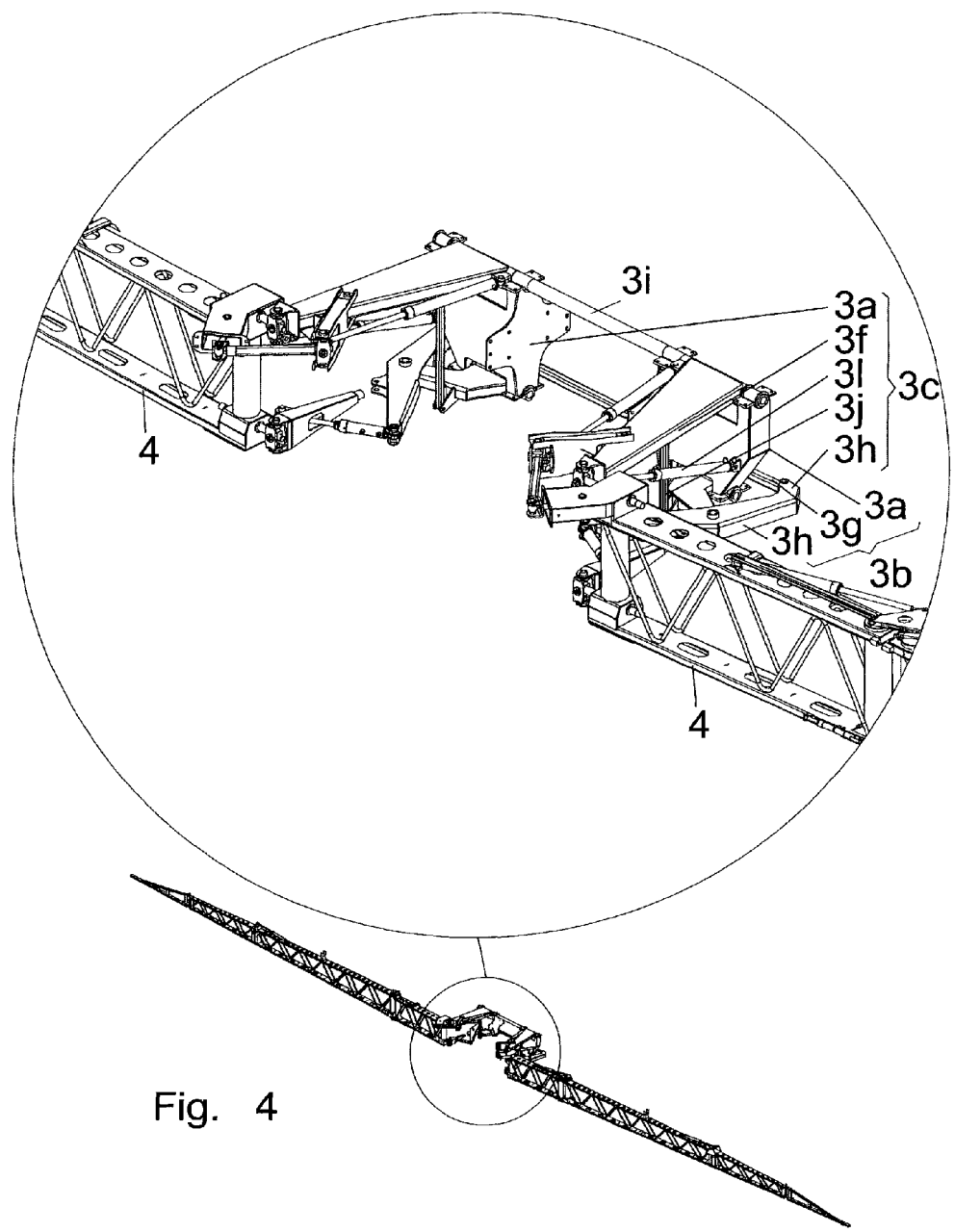

FIG. 4: Perspective view of the central bar with an enlarged detail of the central portion thereof, showing in detail the subsets, horizontal pantograph and vertical pantographs.

Figure 5:
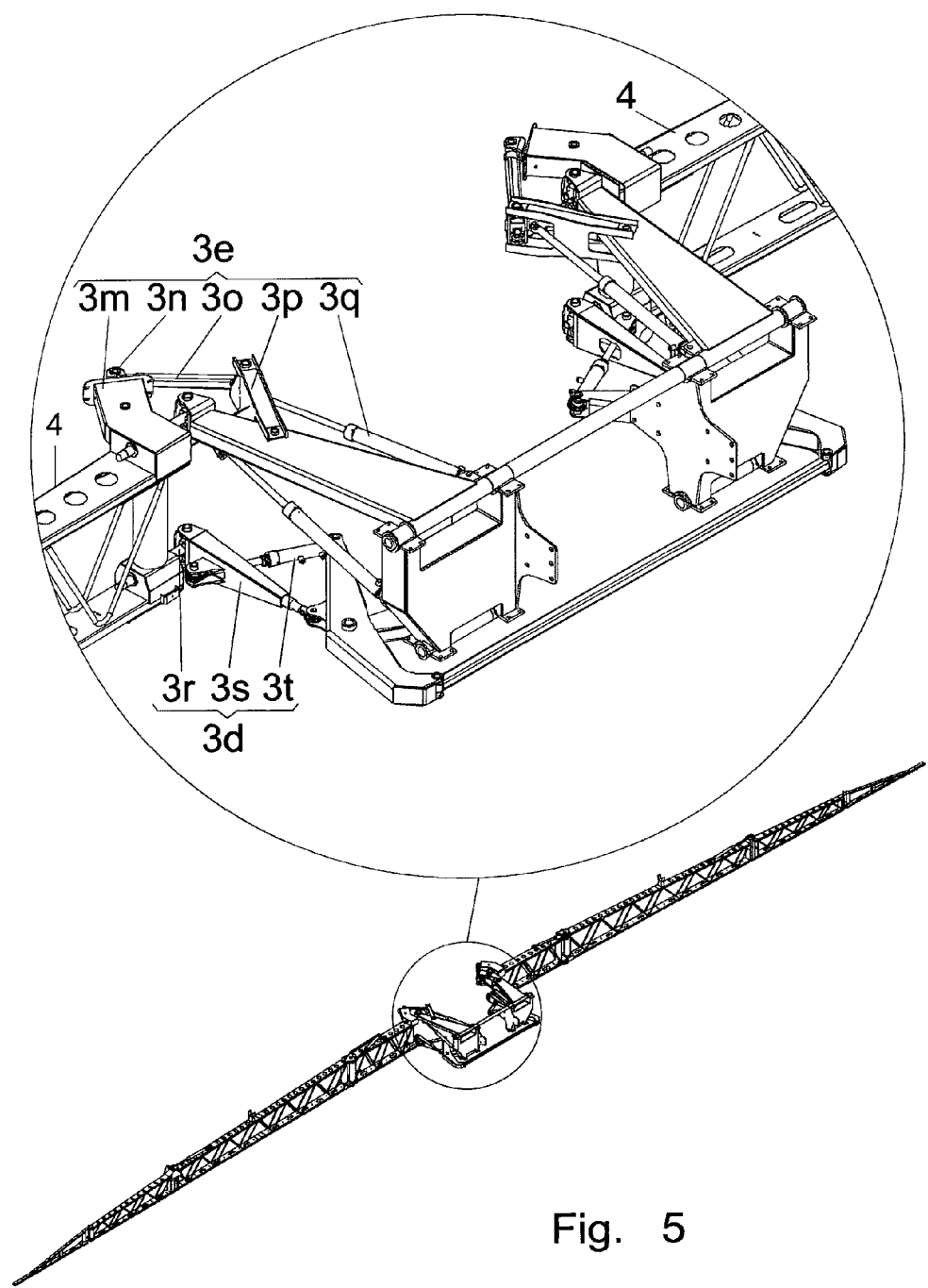

FIG. 5: Perspective view of the central frame, with a detail of the enlarged view of the components, the top and bottom articulation subsets of the side bars.

Figure 6:
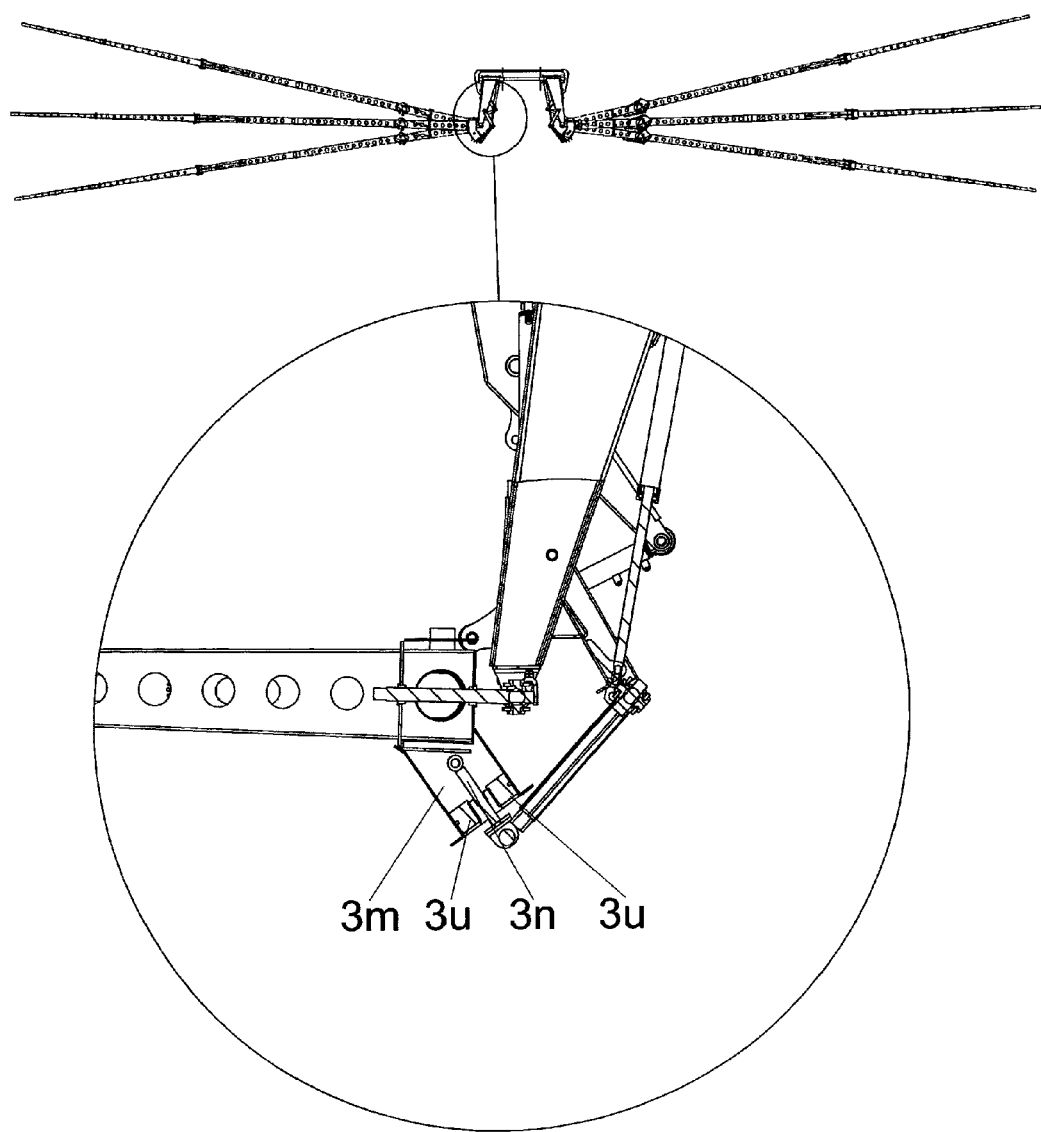

FIG. 6: Drawing of the central bar with an enlarged sectional view showing the placement of the damping bearings within the bracket of the top subset, which depict the damping system of the side bar shocks.

Figure 7:
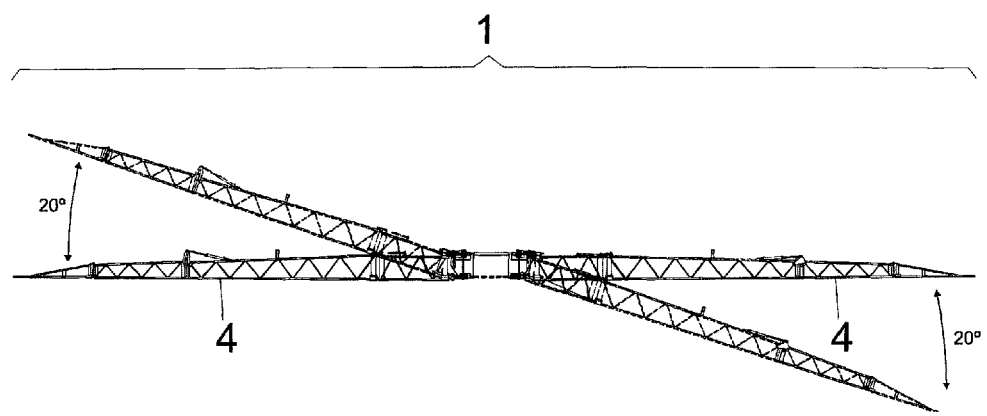

FIG. 7: Front view of the central bar depicting the vertical angular movements of the side bars which compensate the irregular movements of the propeller vehicle in motion.

Figure 8:
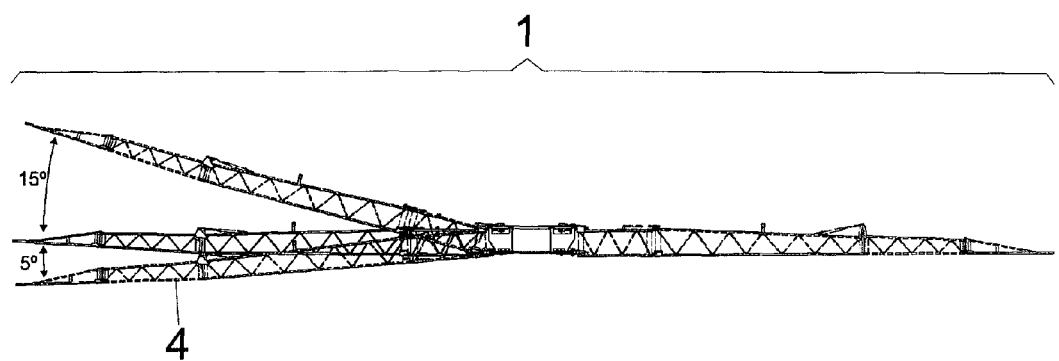

FIG. 8: Front view of the central bar depicting one of the bars rotated vertically due to the action of the hydraulic actuator and another one in the regular working position.

Figure 9:
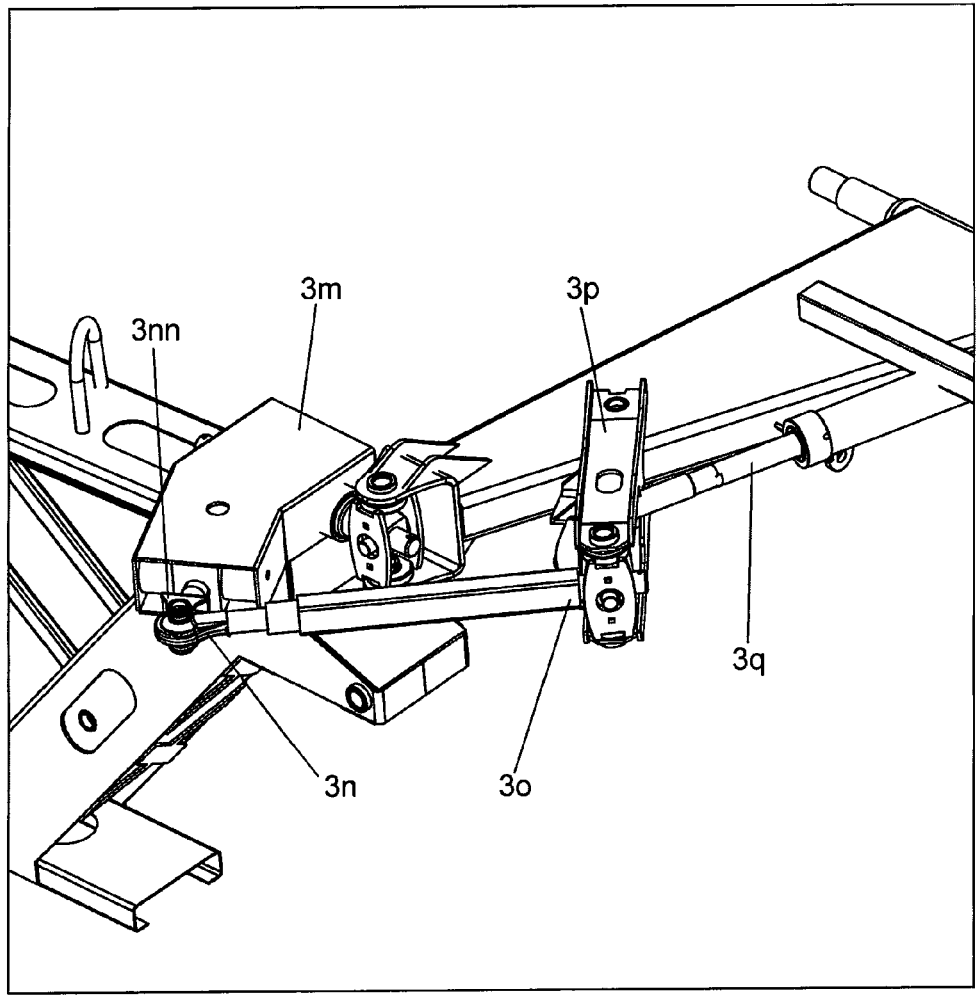

FIG. 9: Perspective view of the other side of central frame.

DETAILED DESCRIPTION OF THE INVENTION

With reference to the attached FIG. 1, we may observe that the central bar (1), for spraying and/or distributing products in powder, liquid or granulate formulations, is composed of a central frame (3) to be fixed on a propeller vehicle associated to a set of side bars (4) which may or may not be divided in modules or sections (5).

In FIG. 2 it is possible to identify and understand the way in which said central bar (1) is fixed to the propeller vehicle (2). The central frame (3) of the central bar (1) is fixed on the chassis (2a) of the propeller vehicle (2), in an intermediate position between the front wheel (2b) and the back wheel (2c), in an attempt to minimize the effects of vibrations and jolts occurring when the equipment is at work; these enable the operator to visualize and control the alignment of said vehicle in the application bands, and prevent a fog of the applied product from being formed in front of the cabin thus decreasing the risk of the operator being intoxicated.

FIG. 3 shows the central frame (3) set and indicates its subsets: Brackets (3a), horizontal pantograph (3b), two vertical pantographs (3c), the subsets for vertical articulation of the bars (3d) and the opening, closing and shock absorbing subsets (3e), of the side bars (4).

FIG. 4 shows, in perspective, the horizontal pantograph set (3b) in detail, and the two sets of vertical pantographs (3c), the horizontal one being composed by the following components: two bottom side arms (3h), the stabilizing bar (3g) and the brackets (3a), which when fixed to the chassis (2a), as indicated on FIG. 2, form a single rigid component. Through its stabilizing bar (3g), the horizontal pantograph (3b) interlinks the two side bars (4) and when it moves to the sides, it pulls the bases thereof towards sides opposite to their movement, thus causing a vertical rotation of the side bars (4), raising the end of one of them while lowering the end of the other one. Such placement of the parts creates a condition of balance of action-reaction forces between the side bars (4). The two vertical pantographs (3c) are formed and identified in this figure by the following components: Subset of brackets (3a); the two top side arms (3f) which form a rigid set with the alternator axis (3i); the two bottom side arms (3h); and the braces (3j), forming a vertical pantograph (3c) for each side of the central frame (3), a hydraulic actuator (3l) being also applied for each one, thus achieving the function of adjusting the working height of said central bar (1).

Referring to the FIGS. 5 and 9, the pieces which make up the two top subsets (3e) and the two bottom subsets (3d) are identified. The top subsets (3e), for opening and closing the side bars (4), are formed by the following pieces: bearing bracket (3m), fixed to the side bars (4), internal brace with a ball and a pin (3n), an attachment brace with a ball and a cross piece (3o), cross piece bracket (3p) and hydraulic actuator (3q), which set of components has the function of opening and closing and absorbing shocks in side bars (4) during movements when at work. Likewise, in FIG. 5 the following pieces may be identified, which compose the bottom subsets (3d): Bar terminal (3r), with a cross piece; an attachment brace (3s), also with ball and cross piece; and a hydraulic actuator (3t), which drives the vertical rotation independently for each side bar (4), of such central bar (1).

In FIG. 6 the way in which the damping bearings (3u) work may be identified, supported by the internal walls of the bearing brackets (3m), against the internal braces (3n), each bearing acting towards one side of the brace in order to soften the jolts and longitudinal shakings suffered by the side bars (4) during movements when at work.

FIG. 7 shows the mentioned central bar (1), on a front view, simulating the vertical rotation movements of the side bars (4), in a condition of balance between them so as to absorb irregular movements caused by said propeller vehicle (2). In practice, constant tilting of said propeller vehicle (2) occurs, with the side bars (4) remaining inert to such movements and maintaining parallel quality of the ground.

FIG. 8, on a front view, shows the central bar (1), with one of its side bars (4), rotated upwards in order to avoid obstacles, through the hydraulic actuator (3t) and the other one in the regular working position. Both side bars (4) may be driven by the hydraulic actuators (3t), independently or simultaneously, according to the needs during work.

This specification refers to a novel and original invention, provided with all requirements for being granted the privilege it applies for.

The invention claimed is:

1. A central bar for spraying and/or distributing products in powder, liquid and granulate formulations, the central bar being located between a front wheel and a rear wheel of a vehicle to reduce oscillation caused by the vehicle driving over irregular terrain, by a tandem effect caused by the location of the central bar, said central bar comprising:

a central frame set including two top subsets, two bottom subsets, a horizontal pantograph subset, two vertical pantograph subsets and damping bearings;

wherein top side arms are hinged by balls and cross pieces, causing three-dimensional movements of two side bars;

wherein the horizontal pantograph subset connects the two side bars;

wherein the two vertical pantograph subsets work together in solidarity through an alternator axis;

wherein the top subsets each include a bearing bracket, internal brace with ball and pin, attachment brace with said ball and cross piece, cross piece bracket and first hydraulic actuator;

wherein the bottom subsets each include a bar terminal, an attachment brace with ball and cross piece, and second hydraulic actuator;

wherein the horizontal pantograph subset includes bottom side arms, stabilizing bar and brackets, which are fixed to form a single rigid component;

wherein the horizontal pantograph subset connects both of said two side bars by means of said stabilizing bar;

wherein the vertical pantograph subsets are driven by said second hydraulic actuators and include said brackets, said bottom side arms, braces and said top side arm, which make up a rigid set with the alternator axis; and wherein the damping bearings are supported by internal walls of the bearing brackets against the internal braces.

2. A central bar for spraying and/or distributing products in powder, liquid and granulate formulations according to claim 1 wherein the two side bars are driven by said second hydraulic actuators, independently or simultaneously.

* * * * *